United States Patent Office 3,196,025
Patented July 20, 1965

3,196,025
CARBON MIX AND METHOD OF
FORMING SAME
Rodolfo R. Balaguer, Fort Lauderdale, Fla., assignor to
J. D. Hedges and Company Limited Partnership,
Kingston, Jamaica, British West Indies, a limited
partnership of Cuba
No Drawing. Filed July 6, 1962, Ser. No. 208,096
9 Claims. (Cl. 106—284)

The present invention relates to carbon mixes and more particularly to carbon mixes to be molded into green carbon articles by application of pressure and current.

In Rodriguez Balaguer United States Patent 2,903,499, granted September 8, 1959, there is described and claimed a primary battery construction using a self-supporting carbon cup. That patent also describes a molding method for forming the carbon cup in which method a carbon mix, e.g., coal tar pitch and electric furnace graphite, are placed in a mold and are contacted with a piston acting under pressure to compress the mix and cause it to conform at least partially to the shape of the mold and piston. An electrical current is then passed through the piston, mix and mold to heat and soften the mix and to cause the same to conform exactly to the shape defined by the mold and piston. The heating and pressure application are terminated when the product has reached a green carbon stage, i.e., when the thermoplastic binder has thoroughly bound together the particles of electrically conductive material without achieving any substantial decomposition of the binder.

The present invention is concerned primarily with providing a carbon mix for use in a molding method of the type described and for making products of the type described and the principal object of the invention has been the provision of a novel and improved carbon mix suitable for use in the method and product described. Another object of the invention has been the provision of a novel and improved method of forming the carbon mix of the invention.

It will be evident that the principles of the invention are applicable also to carbon mixes suitable for molding other products.

In the molding method and product described, some problems have been encountered, particularly when operating with high speed, repetitive techniques. Thus it has been found that occasionally the molded green product will stick to the mold or piston walls and break on removal. And when making carbon cups, particularly very thin walled cups such as those with a 1/32" thickness, occasional cup breakage due to wall weakness has been a problem.

It has been found that use of the carbon mix of the invention minimizes these problems and affords a molding composition which is exceptionally well suited to use in the molding method and product described. Moreover, the carbon mix of the invention has been found to exhibit superior handling qualities well suited to the requirements of high speed, repetitive processing such as must be employed for economical production of essentially low cost items such as battery cups.

The carbon mix of the invention consists essentially of thoroughly intermixed comminuted particles of an electrically conductive carbonaceous material and a basic mix. The term "basic mix" will be defined below.

The electrically conductive carbonaceous material might be graphite, either natural or synthetic, calcined petroleum coke or other carbonaceous material such as well calcined charcoal having similar electrical and physical properties. Scrap electric furnace graphite has been found particularly well suited for this purpose.

By "basic mix" is meant a mixture of carbonaceous raw materials selected and processed as now to be described. The raw materials for the basic mix are carbon black and low melting point carbonaceous binder materials, notably the pitches and particularly coal tar pitch. The binder materials should be solid at room temperatures. In general, any of the various carbon blacks may be used. Thus the term "carbon black," as used herein, is intended to include lampblack as well as the blacks produced by incomplete combustion of gas.

About 30–70% by weight of the binder material and about 30–70% by weight of the carbon black are combined and are heated to a temperature at least equal to and preferably slightly above the melting point of the binder material but below the temperature at which substantial volatile matter is evolved from the mix. Good results have been achieved using a relatively hard coal tar pitch having a melting point of 105° C. and heating the mix to a temperature of about 108° C. At about 121° C. this mixture would achieve its maximum liquid stage. However, at such an elevated temperature (relative to the melting point) low density volatile matter would be lost from the pitch binder, which is undesirable, since the resultant mix is harder and more difficult to extrude than when the maximum temperature is kept relatively close to the binder melting point. The proportion of binder, e.g., pitch, in the basic mix should be selected so that the proportion of the binder material present in the final mix will be from about 10–25%, by weight, of the final mix.

When the materials of the basic mix are thoroughly intermixed at the elevated temperature, the basic mix is allowed to cool and solidify. The basic mix is then broken into fragments in a mill, grinder or other suitable device. Preferably the fragments are 50 mesh or smaller.

The final mix is then formed by combining about 15 to 80% by weight of the basic mix with about 20 to 85% by weight of the electrically conductive carbonaceous material, e.g., graphite or calcined petroleum coke. As mentioned above, the proportion of basic mix in the final mix should be selected so that the proportion of binder in the final mix will lie in the range of about 10 to 25%, by weight, of the final mix. A smaller proportion of binder will result in inadequate bonding of the molded article, while a higher proportion of binder will give the final mix too high an electrical resistivity. The final mix is then comminuted in a suitable mill, grinder or other device, preferably to a fineness at which about 80% will pass a 200 mesh screen. If the final mix is much coarser, some difficulty may be encountered in molding. However, a coarseness of up to about 50 mesh may be used to obtain porosity in the final product. If the final mix is finer than 200 mesh, the resultant product strength will be enhanced, but at the penalty of a lower conductivity.

In making battery cups having cup wall thicknesses of 1/16", a final mix of about 75% synthetic graphite and 25% basic mix has been found desirable. With a thinner wall cup, e.g., 1/32", better results have been achieved with a final mix of about 70% synthetic graphite and 30% basic mix. While the basic and final mixes should consist essentially of the materials discussed above, it will be understood that small quantities of other materials may be included therein for special purposes.

A specific example of a molding composition embodying the invention is a final mix consisting essentially of 25% basic mix and 75% synthetic graphite, the basic mix consisting essentially of 60% coal tar pitch and 40% carbon black. The final mix thus consists essentially of 15% pitch, 10% carbon black and 75% graphite.

Another specific example of a molding composition embodying the invention is a final mix consisting essentially of 30% basic mix and 70% synthetic graphite, the basic mix consisting essentially of 60% coal tar pitch and 40% carbon black. The final mix thus consists essentially of 18% pitch, 12% carbon black and 70% graphite.

Still another example of a molding composition embodying the invention is a final mix consisting essentially of 40% basic mix and 60% synthetic graphite, the basic mix consisting essentially of 40% coal tar pitch and 60% carbon black. The final mix in this case consists essentially of 16% pitch, 24% carbon black and 60% graphite.

If the binder proportion of the basic mix drops below about 30%, the final mix will not be satisfactorily moldable even if the pitch content of the final mix is above 10%. For example, a basic mix of 20% pitch and 80% carbon black has been found unsatisfactory irrespective of the proportions of basic mix to graphite used. Similarly, if the binder content of the final mix exceeds about 25%, the final mix will be unsatisfactory, and this irrespective of the proportions of binder to carbon black in the basic mix.

All or any part of the graphite in the final mixes mentioned above can be replaced with calcined petroleum coke, although in so doing the proportions of binder to carbon black in the basic mix will usually need to be altered to maintain optimum results.

While the invention has been described in connection with specific embodiments thereof and in specific uses, various modifications thereof will occur to those skilled in the art without departing from the spirit and scope of the invention as set forth in the appended claims.

What is claimed is:

1. A carbonaceous molding composition consisting essentially of comminuted particles of from about 15% to 80% by weight, of a basic mix and about 20% to 85%, by weight, of an electrically conductive carbonaceous raw material selected from the group consisting of synthetic graphite, natural graphite, calcined charcoal and calcined petroleum coke, said basic mix consisting essentially of about 30% to 70%, by weight, of coal tar pitch and about 30% to 70%, by weight of carbon black, said basic mix, prior to having been mixed with said electrically conductive raw material, having been heated to a temperature at least equal to the melting point of said pitch but below the temperature at which substantial volatile matter is evolved from said basic mix and thereafter having been cooled, then broken into fragments and then mixed with said electrically conductive raw material, the proportion of said pitch in said molding composition lying in the range of about 10% to 25%, by weight, of said molding composition.

2. A carbonaceous molding composition consisting essentially of comminuted particles of from about 15% to 80%, by weight, of a basic mix and about 20% to 80%, by weight, of an electrically conductive carbonaceous raw material selected from the group consisting of synthetic graphite, natural graphite, calcined charcoal and calcined petroleum coke, said basic mix consisting essentially of about 30% to 70%, by weight, of coal tar pitch and about 30% to 70%, by weight, of carbon black, said basic mix, prior to having been mixed with said electrically conductive raw material, having been heated to a temperature at least equal to the melting point of said pitch but below the temperature at which substantial volatile matter is evolved from said basic mix and thereafter having been cooled, then broken into fragments not coarser than about 50 mesh and then mixed with said electrically conductive raw material, the proportion of said pitch in said molding composition lying in the range of about 10% to 25%, by weight, of said molding composition.

3. A carbonaceous molding composition consisting essentially of comminuted particles of from about 15% to 80%, by weight, of a basic mix and about 20% to 85%, by weight, of graphite, said basic mix consisting essentially of about 30% to 70%, by weight, of coal tar pitch and about 30% to 70%, by weight, of carbon black, said basic mix, prior to having been mixed with said graphite, having been heated to a temperature at least equal to the melting point of said pitch but below the temperature at which substantial volatile matter is evolved from said basic mix and thereafter having been cooled, then broken into fragments and then mixed with said graphite, the proportion of pitch in said molding composition lying in the range of about 10% to 25%, by weight, of said molding composition.

4. A carbonaceous molding composition consisting essentially of comminuted particles of from about 15% to 80%, by weight, of a basic mix and about 20% to 85%, by weight, of calcined petroleum coke, said basic mix consisting essentially of about 30% to 70%, by weight, of coal tar pitch and about 30% to 70%, by weight, of carbon black, said basic mix, prior to having been mixed with said calcined petroleum coke, having been heated to a temperature at least equal to the melting point of said pitch but below the temperature at which substantial volatile matter is evolved from said basic mix and thereafter having been cooled, then broken into fragments and then mixed with said calcined petroleum coke, the proportion of pitch in said molding coposition lying in the range of about 10% to 25%, by weight, of said molding composition.

5. A carbonaceous molding composition for molding thin-walled battery cups by application of electrical current and pressure to the composition, said composition consisting essentially of comminuted particles of from about 25% to 30%, by weight, of a basic mix and about 70% to 75%, by weight, of an electrically conductive carbonaceous raw material selected from the group consisting of synthetic graphite, natural graphite and calcined petroleum coke, said basic mix consisting essentially of about 30% to 70%, by weight, of coal tar pitch having a melting point of the order of 105° C. and about 30% to 70%, by weight, of carbon black, said basic mix, prior to having been mixed with said electrically conductive raw material, having been heated to a temperature of the order of 108° C. and thereafter having been cooled, then broken into fragments not coarser than about 50 mesh and then mixed with said electrically conductive raw material, the proportion of pitch in said composition lying in the range of about 10% to 20%, by weight, of said composition.

6. The method of forming a carbonaceous molding composition, comprising the steps of forming a basic mix consisting essentially of about 30% to 70%, by weight, of coal tar pitch and about 30% to 70%, by weight, of carbon black, heating said basic mix to a temperature at least equal to the melting point of said pitch but below the temperature at which substantial volatile matter is evolved from said basic mix, then cooling said basic mix, then breaking said basic mix into fragments not coarser than about 50 mesh, then combining said basic mix with an electrically conductive carbonaceous raw material selected from the group consisting of natural graphite, synthetic graphite, calcined charcoal and calcined petroleum coke, to form a final mix, said final mix consisting essentially of from about 15% to 80%, by weight, of said basic mix and of from about 20% to 85%, by weight, of said electrically conductive material, and comminuting said final mix at least to a fineness at which said final mix will pass a 50 mesh screen, the proportion of said pitch in said final mix lying in the range of about 10% to 25%, by weight, of said final mix.

7. The method of forming a carbonaceous molding composition, comprising the steps of forming a basic mix consisting essentially of about 30% to 70%, by weight, of a coal tar pitch which is solid at room temperatures and about 30% to 70%, by weight, of carbon black, heating said basic mix to a temperature at least equal to the melting point of said pitch but below the temperature at which substantial volatile matter is evolved from said basic mix, then cooling said basic mix, then breaking said basic mix into fragments not coarser than about 50 mesh, then combining said basic mix with an electrically conductive carbonaceous raw material selected from the group consisting of natural graphite, synthetic graphite and calcined petroleum coke, to form a final mix, said final mix consisting essentially of from about 15% to 80%, by weight, of said basic mix and of from about 20% to 85%, by weight, of said electrically conductive material, and comminuting said final mix to a fineness at which at least about 80% of said final mix will pass a 200 mesh screen, the proportion of pitch in said final mix lying within the range of about 10% to 25%, by weight, of said final mix.

8. The method of forming a carbonaceous molding composition, comprising the steps of forming a basic mix consisting essentially of coal tar pitch and carbon black, heating said basic mix to a temperature at least equal to the melting point of said pitch but below the temperature at which substantial volatile matter is evolved from said basic mix, and then combining said basic mix with an electrically conductive carbonaceous material to form a final mix, said electrically conductive carbonaceous raw material being selected from the group consisting of synthetic graphite, natural graphite, calcined charcoal and calcined petroleum coke.

9. The method set forth in claim 8 in which the proportion of said pitch in said basic mix is not less than about 30%, by weight, of said basic mix and in which the proportion of said pitch in said final mix lies in the range of about 10% to 25%, by weight, of said final mix.

References Cited by the Examiner
UNITED STATES PATENTS

| | | | |
|---|---|---|---|
| 2,527,595 | 10/50 | Swallen et al. | 106—284 |
| 2,799,052 | 7/57 | Stroup | 264—29 |
| 2,903,499 | 9/59 | Balaguer | 136—107 |

ALEXANDER H. BRODMERKEL, *Primary Examiner.*

JOSEPH REBOLD, MORRIS LIEBMAN, *Examiners.*